United States Patent [19]

Hochstein

[11] 4,095,564
[45] Jun. 20, 1978

[54] METHOD AND APPARATUS FOR IGNITING AIR-FUEL MIXTURE IN AN ENGINE

[76] Inventor: Peter A. Hochstein, 14020 Fifteen Mile Rd., Sterling Heights, Mich. 48077

[21] Appl. No.: 628,950
[22] Filed: Nov. 5, 1975
[51] Int. Cl.² .......................................... F02B 53/12
[52] U.S. Cl. ................................ 123/211; 123/117 R
[58] Field of Search ............ 123/8.09, 148 E, 148 CB, 123/149 R, 149 A, 149 C, 149 D, 149 E, 117 R

[56] References Cited
U.S. PATENT DOCUMENTS

| 2,988,065 | 6/1961 | Wankel et al. | 123/8.45 |
|---|---|---|---|
| 3,206,609 | 9/1965 | Dawes | 123/149 R X |
| 3,249,097 | 5/1966 | King | 123/149 R X |
| 3,861,369 | 1/1975 | Canup | 123/148 E |
| 3,913,550 | 10/1975 | Canup | 123/148 E |
| 3,952,708 | 4/1976 | Burley | 123/8.09 |
| 3,961,613 | 6/1976 | Canup | 123/148 E |
| 4,000,724 | 1/1977 | Fowler | 123/117 R |
| 4,022,177 | 5/1977 | Canup et al. | 123/117 R X |

OTHER PUBLICATIONS

*Internal Combustion Engines*, Obert, International Textbook Company, 1968, pp. 532–536.

*Primary Examiner*—Carlton R. Croyle
*Assistant Examiner*—Michael Koczo, Jr.
*Attorney, Agent, or Firm*—McGlynn and Milton

[57] ABSTRACT

A method and apparatus for igniting the air-fuel mixture within a rotary combustion engine. A primary transformer core half and its primary winding are positioned in the upper cover plate of a Wankel rotary engine. Three spark plugs are electrically connected to their own secondary transformer core halves and secondary windings in a hollow rotor piston. The transformer core halves are arranged so that whenever the rotor is in correct position for ignition to occur (around T.D.C.) the primary transformer core half and one secondary transformer core half are in proper alignment for magnetic flux coupling between the two transformer core halves. When so coupled, high voltage necessary for spark plug firing is induced in the secondary winding whenever the primary winding is excited with an alternating current generated by a gated power oscillator. The high voltage induced in the secondary winding is permitted to form a spark across the spark plug gap as long as the primary winding is so excited and the transformer core halves are magnetically coupled.

20 Claims, 5 Drawing Figures

METHOD AND APPARATUS FOR IGNITING AIR-FUEL MIXTURE IN AN ENGINE

BACKGROUND OF THE INVENTION

1. Field of the Invention

This invention relates to ignition systems for internal combustion engines and, in particular, to inductively coupled ignition systems for rotary combustion engines.

2. Description of the Prior Art

While rotary combustion engines offer some significant advantages over conventional reciprocating engines for automotive use, fuel economy and emission problems have delayed the widespread application of these power plants. The precise causes of poor fuel economy and emission difficulties are still being studied. It is clear, however, that the relatively large surface area to combustion volume ratios, shrouded ignition sources, and poor flame front propagation are primary causes of economy and emission problems in the Wankel engine, which is perhaps the most highly developed rotary to date.

Conventional rotary spark ignition engines such as the Wankel generally consist of a stationary outer housing and an internal rotating or oscillating member. As in conventional reciprocating engines, the spark duration is very short, for example, on the order of milliseconds, so that a plurality of plugs and plug holes are required for extended ignition periods. Spark ignition to such rotary engines is usually provided by one or more circumferentially located stationary spark plugs mounted in the outer housing assembly.

Recent engine designs included two spark plug ignition sources, a leading and trailing plug to assure adequate ignition of the mixture. Spark timing is a function of rotor speed and is controlled by two conventional distributors or by one "dual" distributor. The spark plugs communicate with the combustion chamber by means of touch holes in the trochoid housing. In practical engine designs, these holes are at a location and of a diameter which is at best a compromise of performance and efficiency. Ideally, the spark plug holes should be as large as possible so as not to shroud the plug yet not large enough to increase the unswept combustion volume or provide a leakage path past the apex seals.

In the Wankel engine, the spark plugs fire three times per rotor revolution and are never subjected to the cooling of the intake mixture. This continuous high temperature environment requires special premium plugs. Moreover, the shrouded plug tip is particularly susceptible to carbon fouling, since the electrodes are not located in the combustion volume per se and oil is added to the combustion mixture for seal lubrication.

Several attempts by various investigators have been made to remedy the difficulties encountered with peripheral plugs by locating the spark source on the rotor body. Means for high voltage transmission to the rotor assembly have been incorporated on the rotor shaft. Separate high voltage slip rings and sliding contacts must be provided for each spark plug to prevent the spark plugs from firing simultaneously. In this case, spark timing still required an external distributor or a mechanical spark advance mechanism on a high voltage commutator while insurmountable difficulties in high voltage insulation and distribution precluded the effective transmission of spark voltages to the rotor. As a result, no successful application of rotor mounted spark plugs has been made to date.

The invention described herein makes possible the use of rotor mounted spark plugs with none of the attendant difficulties in handling the high voltages. In addition, the invention eliminates the use of distributors or mechanical spark timing apparatus, while permitting spark durations of up to 90° of crank rotation.

SUMMARY OF THE INVENTION

An apparatus and method are provided for igniting a fuel-air mixture in an internal combustion engine. The fuel-air mixture is ignited in a combustion chamber defined by first and second components which move through repetitive cycles relative to one another. Generating means is adapted to be attached to the first component for generating a magnetic flux. Ignition means is adapted to be attached to the second component and is responsive to the generating means when it is magnetically coupled thereto through the magnetic flux generated by the generating means. The magnetic flux coupling occurs during a predetermined portion of the relative movement between the first and second components within each repetitive cycle and, as a result of the magnetic flux coupling, an ignition signal is provided in the combustion chamber.

The generating means is provided with a first coil means and an oscillator means while the ignition means includes a second coil means. Magnetic flux coupling occurs during the predetermined portion of the relative movement when the first coil means and the second coil means are in alignment for magnetic flux coupling and the oscillator means energizes the first coil means.

Other advantages of the present invention will be readily appreciated as the same becomes better understood by reference to the following detailed description when considered in connection with the accompanying drawings wherein:

DESCRIPTION OF THE PREFERRED EMBODIMENT

Figure 1:
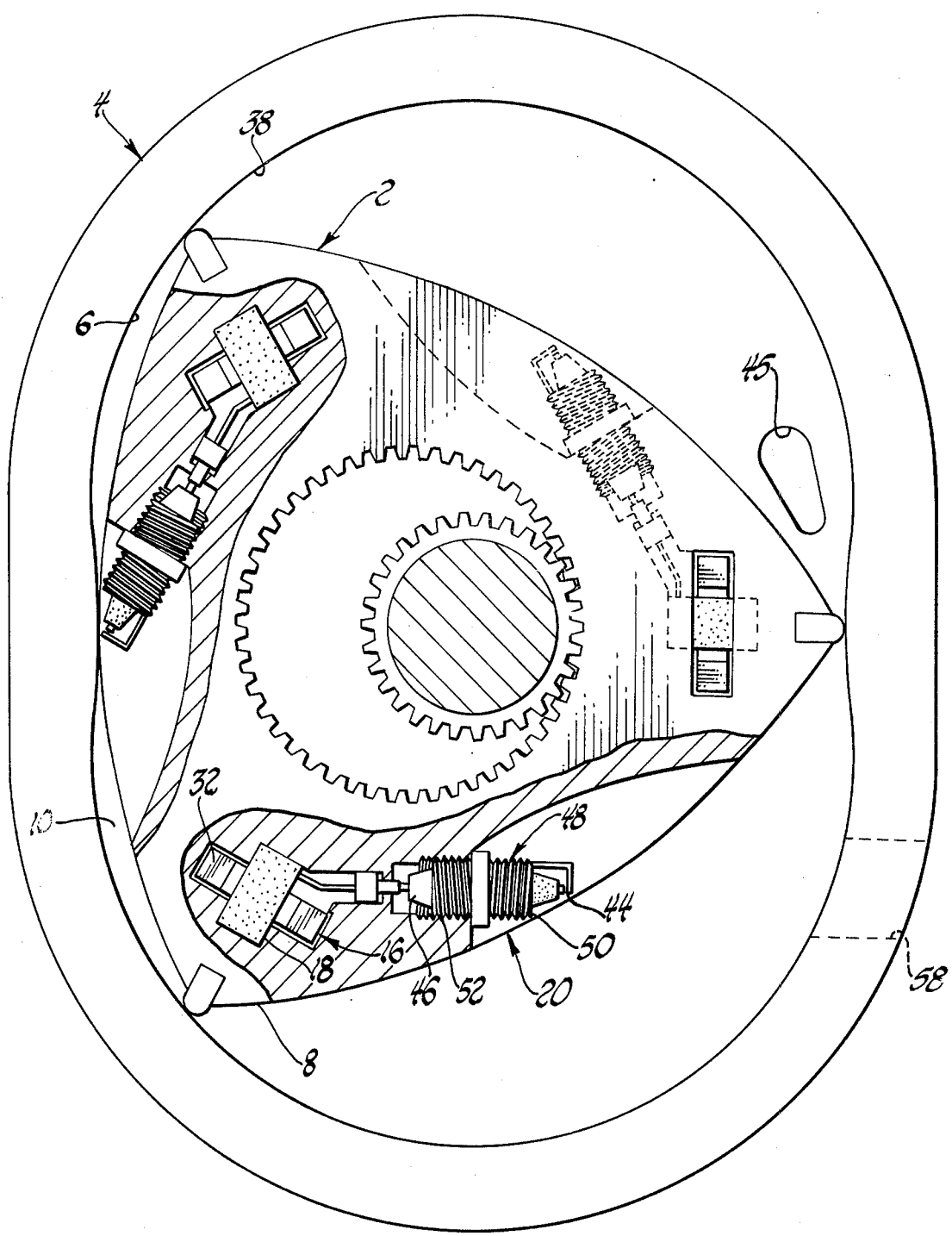
FIG. 1 is a partial cross-sectional view of a Wankel engine piston housing showing the rotary piston within the trochoid housing and the position of the ignition means within the piston.

The present invention relates to an ignition assembly for use in an internal combustion engine and, more particularly, for use in a rotary piston engine. The engine has first and second components which define an ignition chamber and which move through repetitive cycles relative to one another. The second component is a triangular or rotary piston generally indicated at 2 and the first component is a housing generally indicated at 4 whose internal cross section is epitrochoid in shape. The triangular piston 2 and the housing 4 define a combustion chamber 6 and move through repetitive cycles relative to one another. In other words, the combustion chamber 6 is formed between first and second corners 8 of the triangular piston 2 in a predetermined portion of the housing 4 such as shown in FIG. 1 wherein the triangular piston 2 of a Wankel rotary engine is shown in T.D.C. (top dead center) position wherein maximum mixture compression is achieved. The combustion chamber 6 is further formed by the lower cover plate 10 of the housing 4 and the upper cover plate 12 of the housing 4 (not shown in FIG. 1, but shown in a broken view in FIG. 2).

Figure 4:
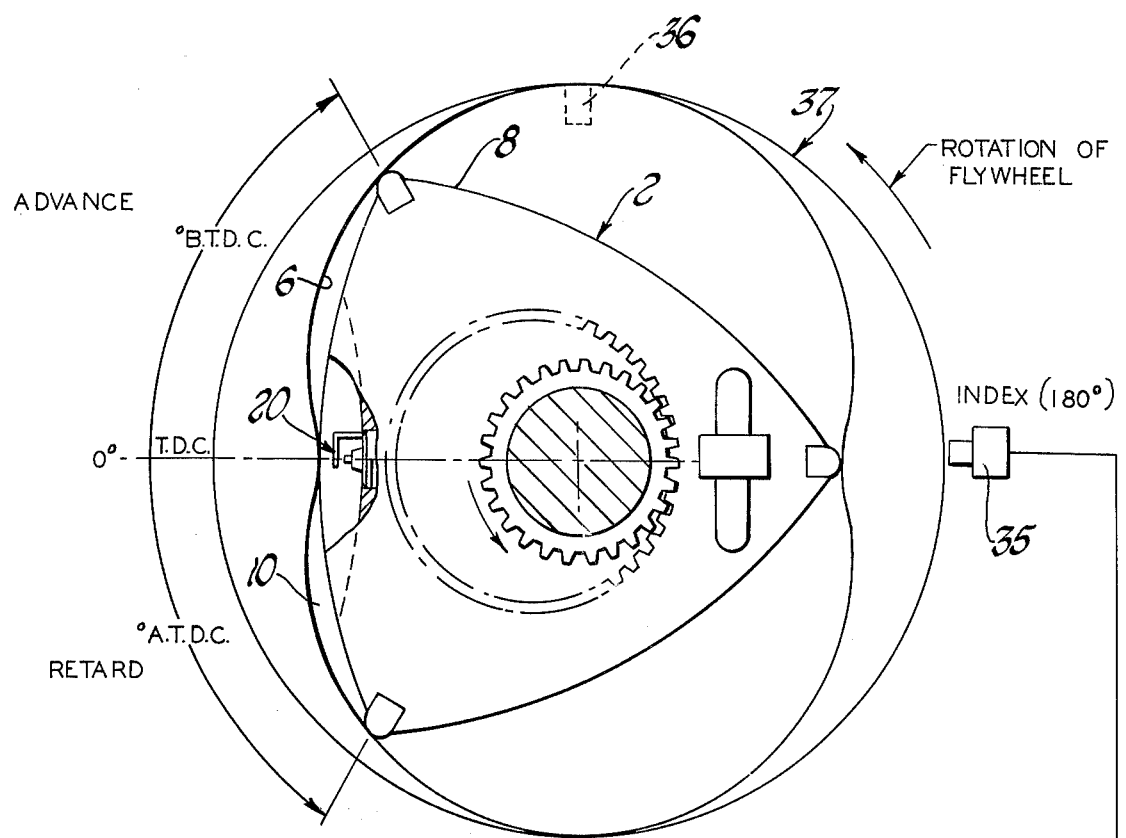
FIG. 4 is a block diagram showing the inductive ignition system of the invention with the first and second coil means in proper alignment for magnetic flux coupling, and the second coil means disposed 180° from T.D.C.
Figure 4:
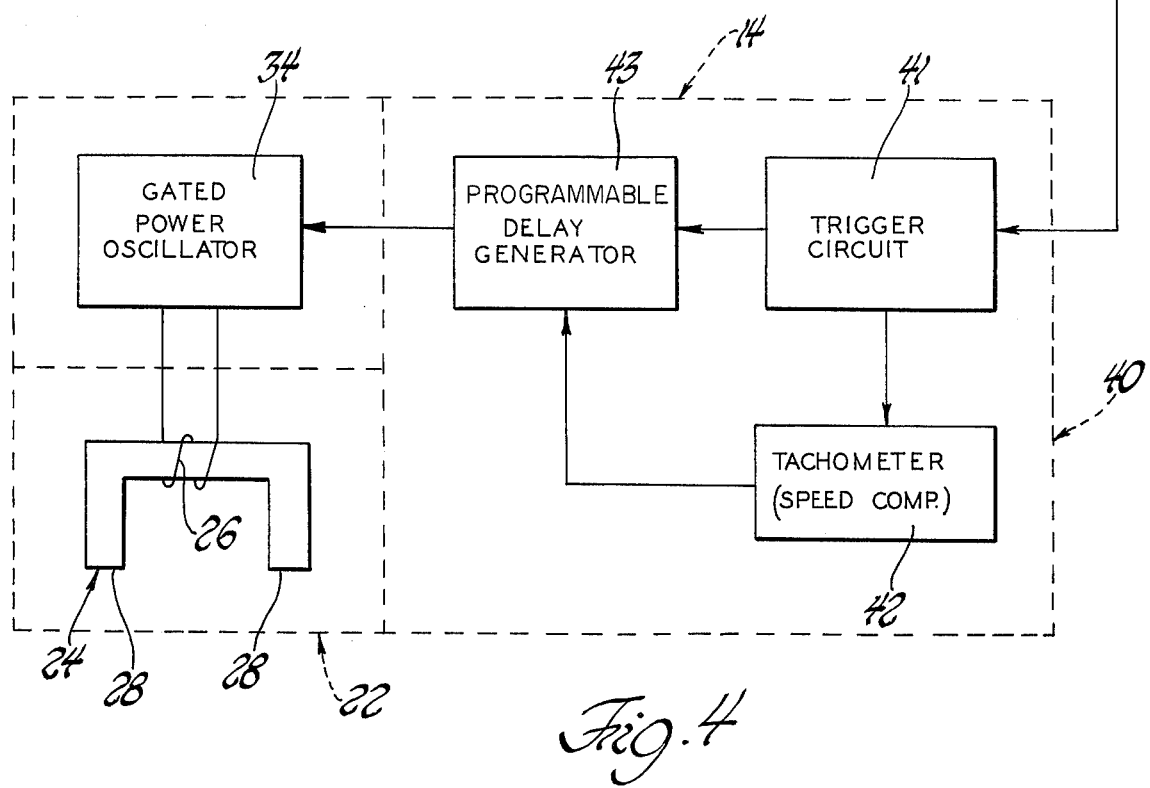

The ignition assembly is comprised of the generating means generally indicated at 14 in FIG. 4, which is adapted to be attached to the housing 4 for generating a magnetic flux and ignition means responsive to the generating means 14. The ignition means includes second coil means such as the secondary transformer core half generally indicated at 16 and its secondary winding 18 electrically connected to the fuel ignition means or spark plug means such as the spark plug generally indicated at 20. The ignition means is adapted to be attached to the triangular piston 2 such as within the hollow triangular piston 2 and is responsive to the generating means 14 when it is magnetically coupled to the generating means 14 through the magnetic flux during a predetermined portion of the rotary movement between the triangular piston 2 and the housing 4 such as at T.D.C. At T.D.C. the combustion chamber 6 is formed, and the ignition means provides an ignition signal such as a 30,000 volt spark within the combustion chamber 6.

Generating means 14 includes the first coil means generally indicated at 22 and which includes the primary transformer core half 24 and its primary winding 26. The first coil means 22 and the second coil means are in proper alignment for magnetic flux coupling during a predetermined portion of rotary movement between the triangular piston 2 and the housing 4 while the combustion chamber 6 is formed. In other words, as long as faces 28 of primary transformer core half 24 of first coil means 22 overlap and portion of faces 32 of secondary transformer core half 16, the first coil means 22 will be in alignment for magnetic flux coupling with the second coil means. The first coil means 22 and the second coil means are thus formed in the housing 4 and in the rotary piston 2 respectively, such that they are in proper alignment for a magnetic flux coupling during the time which the rotary movement between the triangular piston 2 and the housing 4 has caused the combustion chamber 6 to be formed.

As seen in FIG. 4, the generating means 14 includes an oscillator means such as the high frequency gated power oscillator 34. The oscillator 34 is gated and operates at approximately 25 kilohertz and energizes the first coil means 22 to produce the magnetic flux at T.D.C. to magnetically couple the first coil means 22 to the second coil means. Spark plug 20, adapted to be disposed in the combustion chamber 6, is electrically connected to the second coil means for providing the spark within the combustion chamber 6.

Figure 5:
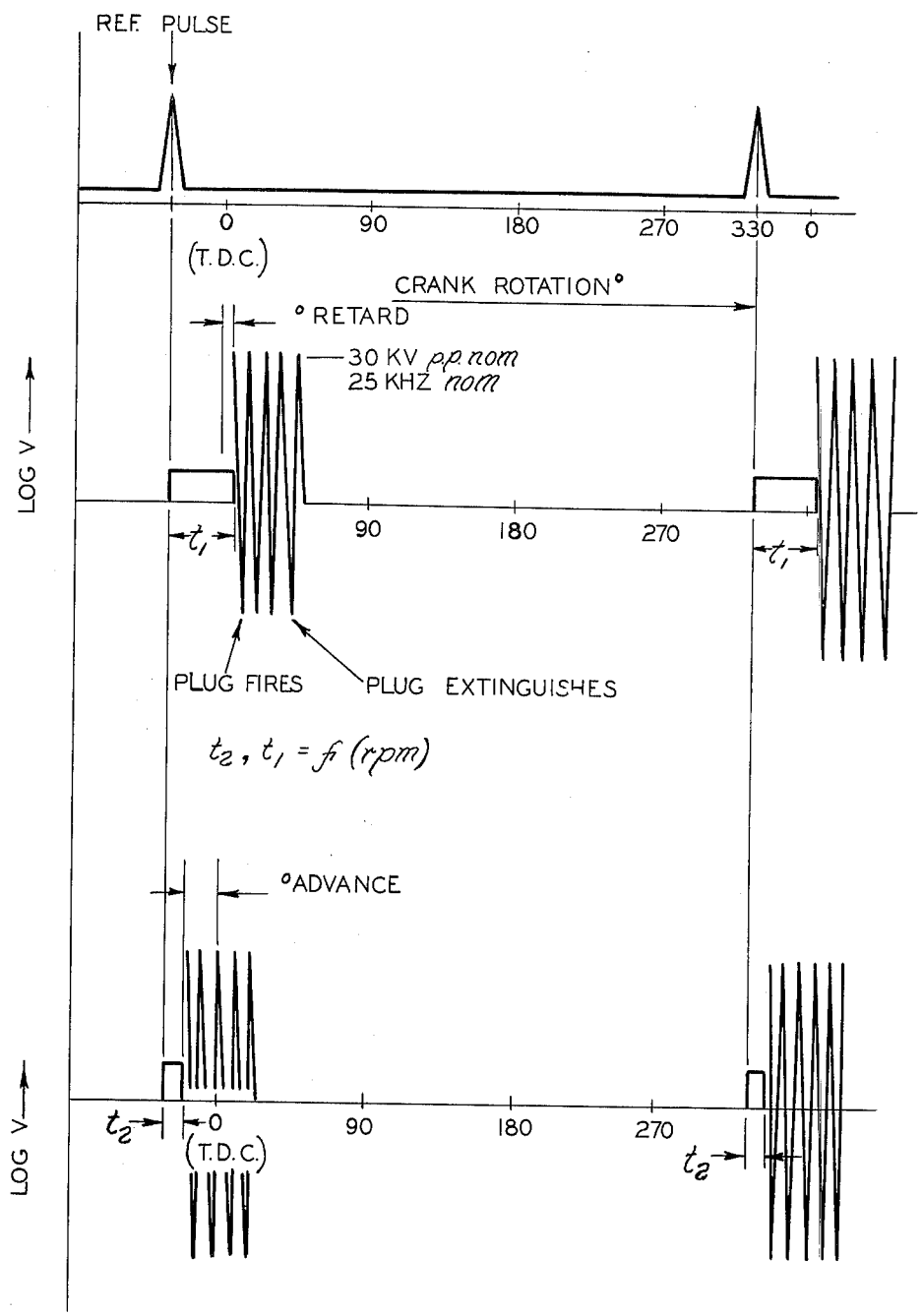
FIG. 5 shows graphs of the log of the voltage that appears in one secondary winding as a function of the degrees of crank rotation of the rotary piston within the housing.

A reference means such as pick-up coil 35 provides a reference signal such as a reference or trigger pulse when the triangular piston 2 is in a predetermined position, as is shown in FIG. 5, relative to the housing 4, or, in other words, 30° B.T.D.C. (before top dead center). It is to be understood that FIG. 5 only shows the reference pulse to fire one spark plug. This reference pulse is emitted by the pick-up coil 35, positioned 180° B.T.D.C., whenever magnet 36 mounted on rotary fly wheel 37 rotates past pick-up coil 35 to induce a current in pick-up coil 35. Since the Wankel rotary piston engine has three rotary pistons the fly wheel 37 rotates at three times the speed of triangular piston 2 and, as seen in FIG. 4 which shows the triangular piston 2 in T.D.C. position, magnet 36 has moved 90° from pick-up coil 35.

The generating means 14 also includes control means 40 which is responsive to the trigger pulse. The control means 40 controls the power oscillator 34 which, in turn, energizes the first coil means 22 in response to the trigger pulse. The trigger pulse is amplified and shaped by trigger circuit 41 in order to put the pulse in proper form to control power oscillator 34.

The control means 40 includes programmable delay means, such as programmable delay generator 43, for delaying the energization of the first coil means 22 for a predetermined time period after the occurrence of the reference pulse such as until triangular piston 2 is in T.D.C. position, as seen in FIG. 4. At this point the first coil means 22 will be in proper alignment for magnetic flux coupling with the second coil means.

The control means 40 further includes sensing means such as tachometer circuit 42 for sensing the frequency that triangular piston is positioned 30° B.T.D.C. and for changing the predetermined time period in response to a change in the frequency by programming the delay generator 43 to delay the trigger pulse. The tachometer circuit 42 programs the advance speed characteristic of the ignition system in much the same way that centrifugal and vacuum advance operate in conventional Kettering ignition systems. For example, at low engine r.p.m. tachometer circuit 42 programs the delay generator 43 to delay the trigger pulse a greater period than that at higher r.p.m. The effect is that at low r.p.m. the spark plug 20 is fired at or after T.D.C. (retard) and at higher r.p.m., the spark plug 20 is fired before T.D.C. (advance).

With reference to FIG. 5, it can be seen that the number of degrees of crank rotation before the spark plug 20 fires after the occurrence of the reference pulse, is a function of the rotations per minute of the rotary piston 2 within the housing 4. In general, it can be said that as the rotations per minute of rotary piston 2 increase, the delay generator 43 causes the length of time between the reference pulse and the firing of the spark plug 20 to decrease. This is desirable since the faster the rotating piston 20 moves there is less and less time during which the combustion chamber 6 exists between the rotary piston 2 and the housing 4. Therefore, the fuel-air mixture which enters through intake port 45 must be pre-ignited, before T.D.C., to insure that as much of the fuel-air mixture burns as possible about T.D.C. It is also noted from FIG. 5 that when the rotations per minute for the rotary piston 2 is at a low figure, spark plug 20 ignites the fuel-air mixture slightly after T.D.C. in order to overcome the inertia of the rotary piston 2. Furthermore, the duration of the spark is totally independent of spark timing, and may, in fact, be as long as the burn cycle or as long as combustion chamber 6 is formed at any given r.p.m., the duration of the spark being dependent on the width of the trigger pulse and the geometric configuration of faces 28 and faces 32. In other words, the spark plug 29 is fired as long as trigger pulse gates oscillator 34 at the same time faces 28 and faces 32 are aligned for magnetic flux coupling.

A variation of the positioning of the first coil means 22 and second coil means can be seen in FIG. 4 wherein the second coil means is disposed adjacent the third corner of rotary piston 2 opposite combustion chamber 10. The first coil means 22, while not shown, is in position for magnetic flux coupling with the second coil means in FIG. 5. That is, the first coil means 22 is generally disposed 180° from T.D.C. in the upper cover plate 12 (not shown). The placement of the first coil means 22 and the second coil means is such as to take advantage of the approximate 1:3 ratio in relative motion at 180° vs. 0°. The arc described by the relative motion between the first coil means 22 and second coil means is small compared to the larger arc described by the spark plug 20, as the spark plug 20 travels through T.D.C. position.

Figure 2:
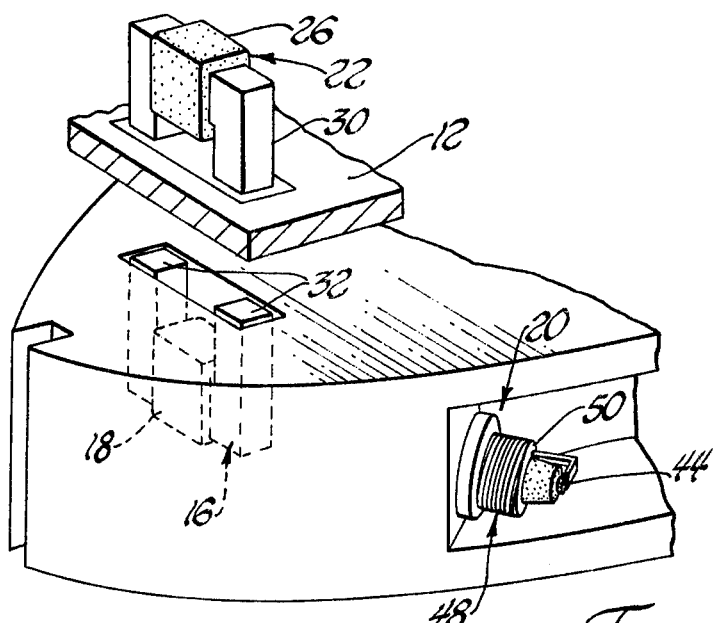
FIG. 2 is a fragmentary perspective view of one corner of the triangular rotating piston and the upper cover plate of the housing showing the primary transformer core half and its primary winding in the housing and secondary transformer core half and its secondary winding in the rotary piston in proper alignment for magnetic flux coupling at T.D.C.
Figure 3:
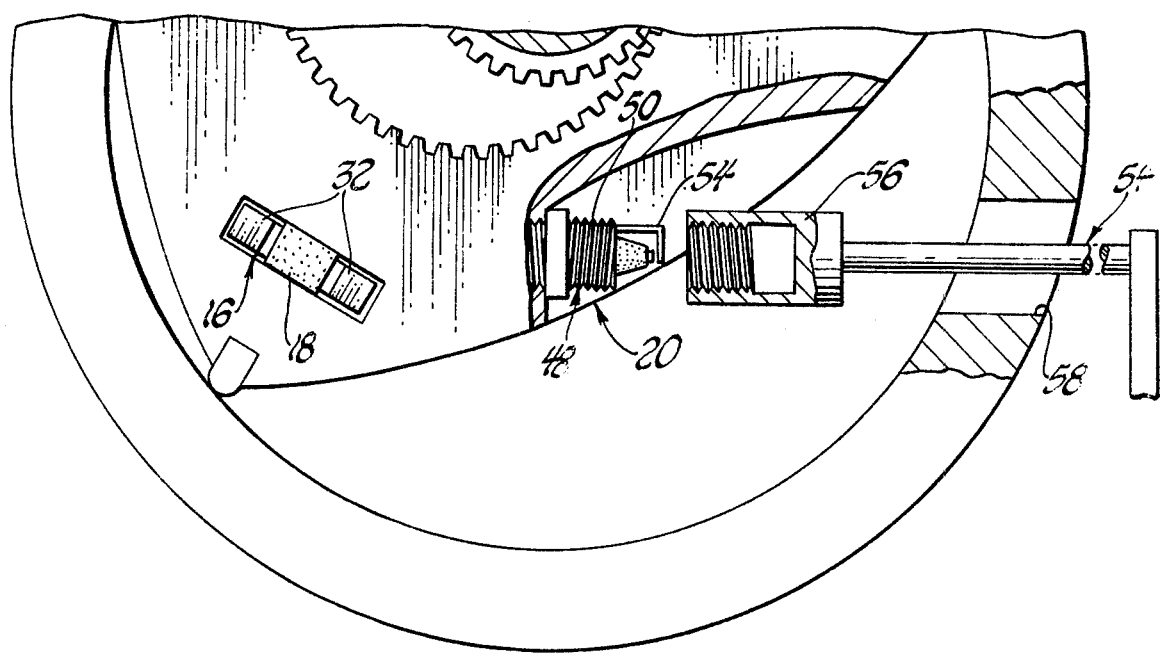
FIG. 3 is a fragmentary cross-sectional view of a Wankel engine showing a spark plug with left and right handed threads and a tool for removing the spark plug from the rotary piston through the exhaust port of the Wankel.

Spark plug 20 has a sparking end 44, a connector end 46 and an intermediate portion 48 which electrically connects the sparking end 44 and the connector end 46. The sparking end 44 provides the spark for ignition while the connector end 46 is electrically connected to the secondary winding 18 of the second coil means. The intermediate portion 48 has a first outer surface 50 threaded in a predetermined direction such as left-handed as shown in FIGS. 1, 2 and 3 adjacent the sparking end 44. The intermediate portion 48 also has a second outer surface 52 threaded in a direction opposite the left-handed threaded direction of the first outer surface or, in other words, in a right-handed direction, adjacent to the connector end 46 for screwing spark plug 20 into triangular piston 2.

The first and second outer surfaces 50 and 52 are formed in this way so that a removal tool 54 which is threaded in the same direction as the first outer surface 50 within its removing head 56 so that the spark plug 20 can be securely screwed within the removing head 56 before the spark plug 2 is unscrewed by tool 54 which extends through exhaust port 58. Therefore, after the first outer surface 50 is securedly screwed within the removing head 56, the continued unscrewing motion of the tool 54 unscrews the second outer surface 52 from triangular piston 2 to remove spark plug 20 from the rotary combustion engine. It is easy to see how the reverse procedure can be used to position a new spark plug within the rotary combustion engine.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An ignition assembly in combination with a rotary piston engine having a triangular piston which has three corners and which rotates within a housing whose internal cross section is epitrochoid in shape, a combustion chamber being formed by first and second corners of the triangular piston and a predetermined portion of the housing, both first and second corners being adjacent the predetermined portion of the housing, said ignition assembly comprising: generating means attached to the housing for generating a magnetic flux, and ignition means attached to the triangular piston and responsive to said generating means when magnetically coupled thereto through said magnetic flux during a predetermined portion of the rotary movement between the triangular piston and the housing while the combustion chamber is formed for providing a spark within the combustion chamber.

2. An assembly according to claim 1 wherein said generating means includes first coil means and said ignition means includes second coil means, said first coil means and said second coil means being in alignment for said magnetic flux coupling during said predetermined portion of the rotary movement.

3. An assembly according to claim 2 wherein said generating means includes oscillator means for energizing said first coil means to produce said magnetic flux during said predetermined portion of the rotary movement.

4. An assembly as set forth in claim 3 wherein said ignition means includes spark plug means extending into the combustion chamber and electrically connected to said second coil means for providing said spark.

5. An assembly according to claim 4 wherein said second coil means is disposed adjacent the third corner of the triangular piston.

6. An assembly according to claim 5 wherein said spark plug means includes a spark plug wherein said spark plug has a sparking end, a connector end, and an intermediate portion electrically connecting said sparking end and said connector end, said sparking end providing said spark and said connector end being electrically connected to said second coil means, wherein said intermediate portion has a first outer surface threaded in a predetermined direction adjacent said sparking end and a second outer surface threaded in a direction opposite said predetermined direction adjacent said connector end, said spark plug being threadingly attached to the triangular piston at said second outer surface and said sparking end extending into the combustion chamber.

7. An assembly according to claim 3 further comprising reference means for providing a reference signal to said generating means for indicating when the triangular piston is in a predetermined position relative to the housing.

8. An assembly as set forth in claim 7 wherein said generating means includes control means responsive to said reference signal for controlling said oscillator means for, in turn, energizing said first coil means in response to said reference signal.

9. An assembly as set forth in claim 8 wherein said control means includes programmable delay means for delaying said energization of said first coil means a predetermined time period after the occurrence of said reference signal.

10. An assembly as set forth in claim 9 wherein said control means further includes sensing means for sensing the frequency the triangular piston is in said predetermined position and for changing said predetermined time period in response to a change in said frequency.

11. An ignition assembly in combination with an internal combustion engine having first and second components which define a combustion chamber and move through repetitive cycles relative to one another, said ignition assembly comprising: generating means attached to said first component for generating an alternating magnetic flux independently of the relative movement between first and second components, and ignition means attached to said second component and responsive to said alternating flux established by said generating means when magnetically coupled thereto through said alternating flux during a predetermined portion of the relative movement between the first and second components of each repetitive cycle for providing an ignition signal within the combustion chamber.

12. An assembly according to claim 11 wherein said generating means includes first coil means and said ignition means includes second coil means, said first coil means and said second coil means being in alignment for magnetic flux coupling during said predetermined portion of relative movement.

13. An assembly according to claim 12 wherein said generating means includes oscillator means for energizing said first coil means to produce said magnetic flux during said predetermined portion of relative movement.

14. An assembly as set forth in claim 13 wherein said ignition means includes a fuel ignition means extending into the combustion chamber and electrically connected to said second coil means for providing said ignition signal.

15. An assembly according to claim 13 further comprising reference means for providing a reference signal to said generating means for indicating when the first component is in a predetermined position relative to said second component.

16. An assembly as set forth in claim 15 wherein said generating means includes control means responsive to said reference signal for controlling said oscillator for, in turn, energizing said first coil means in response to said reference signal.

17. An assembly as set forth in claim 16 wherein said control means includes programmable delay means for delaying said energization of said first coil means a predetermined time period after the occurrence of said reference signal.

18. An assembly as set forth in claim 17 wherein said control means includes sensing means for sensing the frequency of said first component being in said predetermined position and for changing said predetermined time period in response to the change in said frequency.

19. A method for igniting a fuel-air mixture in an internal combustion engine having a first component and a second component which define a combustion chamber and which move through repetitive cycles relative to one another, the first component having attached to it a first half of a transformer core and its primary winding and the second component having attached to it a second half of a transformer core and its secondary winding such that the core halves are in proper alignment for magnetic flux coupling during a predetermined portion of the relative movement, the secondary winding being electrically connected to a spark plug whose electrodes extend into the combustion chamber, said method comprising the steps of moving the first and second components through one cycle including the predetermined position and energizing the primary winding with an alternating electric current.

20. A method according to claim 19 wherein said energization step occurs for a predetermined time period while the first half of the transformer core and the second half of the transformer core are in proper alignment for magnetic flux coupling.

* * * * *